No. 628,788. Patented July 11, 1899.
J. FRUDENFELD.
ACCOUNT BOOK.
(Application filed Nov. 26, 1898.)

(No Model.) 2 Sheets—Sheet 1.

No. 628,788.  
J. FRUDENFELD.  
ACCOUNT BOOK.  
(Application filed Nov. 26, 1898.)

(No Model.)

Patented July 11, 1899.

2 Sheets—Sheet 2.

Fig. 3.

Witnesses  
F. S. Elmore  
Arthur Ashley

Inventor  
Joseph Frudenfeld  
By P. Dodge  
Attorney

UNITED STATES PATENT OFFICE.

JOSEPH FRUDENFELD, OF MADISON, SOUTH DAKOTA.

ACCOUNT-BOOK.

SPECIFICATION forming part of Letters Patent No. 628,788, dated July 11, 1899.

Application filed November 26, 1898. Serial No. 697,560. (No model.)

*To all whom it may concern:*

Be it known that I, JOSEPH FRUDENFELD, of Madison, county of Lake, and State of South Dakota, have invented a new and useful Improvement in Account-Books, of which the following is a specification.

This invention relates to an account-book for use in keeping business accounts, the aim of the invention being to simplify the system of bookkeeping now in general use by substituting for the journal, ledger, cash, and other incidental books a single account-book formed, as hereinafter described and claimed, to facilitate the entry of the various items of account.

Referring to the drawings, Figure 1 is a perspective view of my improved book. Fig. 2 is a plan view of one of the parts or sections opened to show the ruling and index. Fig. 3 is a similar view of one of the sections opened at the center.

In the accompanying drawings my improved account-book consists of a series of parts or sections A A', &c., bound together in the form of a book, as shown in Fig. 1. Each of these parts comprises outer pages $a$ $a'$ and inner intermediate leaves $b$ $b'$, all of which are ruled horizontally for individual accounts and vertically into columns for the particulars of the accounts. The inner leaves are less in width than the outer pages, so that when opened, as shown in Figs. 2 and 3, marginal spaces $c$ $c'$ of the outer pages will be exposed, which bear numbers—in the present case from "1" to "25"—corresponding to the horizontal spaces between the rulings, this arrangement enabling the bookkeeper to locate instantly and without trouble throughout all the pages the proper line for the credit entry after the debit entry has been made opposite a particular name. The inner leaves are also less in height than the outer pages, so that a marginal space $c^2$ is exposed at the top of the outer pages, which space bears numerals corresponding to the vertical columns of the outer pages, this arrangement enabling the bookkeeper to quickly find the appropriate column for a credit entry after a corresponding debit entry in any column has been made.

The debit side of the book comprises outer page $a$ and inner leaf $b$, while the credit side comprises inner leaf $b'$ and outer page $a'$, which sides contain corresponding vertical columns correspondingly numbered from "1" to "21" in the present instance, according to the numbers of items constituting the particulars of the accounts. The marginal numerals at the top of the outer page $a$ for the debit side run from "1" to "6" and continue along the upper edge of the inner leaf $b$ on both sides, while the inner leaf $b'$ contains numerals from "1" to "14" on both sides, which are continued along the margin of the outer page $a'$. This insures a like numbering of the columns for the particulars of accounts on both the debit and credit sides and enables the proper credit column to be located without delay.

The outer page $a$ bears a column $d$ next the numbered margin for the entry of the date of the transaction, a wider column $e$ for the name of the party of the transaction, and succeeding columns $f$ $g$ $h$ $i$, &c., entitled, respectively, at the top "Banks of deposit," "Cash," "Merchandise bought," "Freight and express," &c., and numbered "1," "2," "3," "4," &c., throughout this page and along both sides of leaf $b$, these items constituting the particulars of the accounts of the debit side. The credit side, comprising leaf $b'$ and page $a'$, contains corresponding columns correspondingly entitled and numbered. It will of course be understood that the number of columns and leaves may be varied according to the number of items of account, those shown being such as are commonly used in the transaction of an ordinary business.

At the bottom of the pages there is a horizontal space $k$ for the totals of the items of each column, which totals are to be forwarded to the next part or section A' of the book when this part is exhausted, and this space is entitled "Totals forward." Beneath this is a horizontal space $l$, entitled "Number of headings, debit and credit," which space is divided into columns numbered from "1" to "21" to correspond to the particulars of the accounts, and each column is divided, as at $m$ $m'$, for the entry, respectively, of debit totals and credit totals, the columns being entitled, respectively, "Dr." and "Cr." Beneath this space $l$ is a horizontal space $o$, entitled "Debit balances," which is divided into columns numbered from "1" to "21," in which may be entered the debit balance of the correspondingly-numbered item of account if the balance happens to be on the debit side, while if the balance is on the credit side the entry is made in a horizontal space $p$ below, entitled "Credit balances," and divided and numbered similar to the columns of the accounts. In order that the entitling of these spaces $l$, $o$, and $p$ at the bottom of the pages may be viewed at all times without regard to the point at which the section is opened, I cut away the inner leaves at their lower outer corners, as at R, which permits the proper horizontal space when an entry is to be made in them to be located at once.

In order to provide for a trial balance of the accounts when a section is exhausted, I provide at the lower right-hand corner of outer page $a'$ three horizontal spaces S, T, and U, one beneath the other and entitled, respectively, "Total of debit balances," "Total of credit balances," and "Totals of debit and credit bal." In space S is entered the total of all entries in space $o$, while in space T is entered the total of all entries in space $p$, and in space U is entered the total of all entries in space $l$, both debits and credits, and if the accounts are correct the sum of the entries in spaces S and T will equal the entry in space U.

From the foregoing description it will be seen that by the use of my improved book, formed as described, the system of keeping the accounts is attended with little time and trouble, the exposed numbers of the horizontal spaces at the sides and top of the outer pages and the exposed entitling of the horizontal spaces at the bottom of the pages for the totals enabling the various entries to be made without delay and the trouble of searching for the appropriate column or space. Further, it will be seen that by obviating the use of the usual ledger, journal, cash, and other books much labor and time are saved, and the liability of making mistakes due to posting is reduced to a minimum.

To facilitate the location of the line on the credit side for a credit entry after the debit has been made opposite the name of a party, the inner leaves may have their margins numbered to correspond to the line-numberings on the margins of the outer pages, as at $x$.

Having thus described my invention, what I claim is—

1. In an account-book the combination of a series of parts or sections bound together and each consisting of outer pages $a$ $a'$ and inner leaves $b$ $b'$ less in height than the outer pages to expose the upper edge of the same, said pages and leaves being ruled horizontally for individual accounts and vertically into columns for the particulars of the accounts, and the vertical columns numbered consecutively from "1" on the outer page $a$ and then continuing on both sides of the inner leaf $b$ for the debit side, and from "1" on the inner leaf $b'$ and continuing on both sides of the same and the outer page $a'$ for the credit side.

2. In an account-book, the combination of a series of parts or sections bound together and each comprising outer pages and inner leaves containing horizontal rulings and two series of vertical columns correspondingly numbered for debit and credit, said pages having at their bottoms horizontal spaces for total entries numbered to correspond to one of the series of vertical columns, and entitled at the outer edge of the outer page, the inner leaves being cut away at their lower outer corners to expose to view the entitling of the lower spaces.

In testimony whereof I hereunto set my hand, this 11th day of November, 1898, in the presence of two attesting witnesses.

JOSEPH FRUDENFELD.

Witnesses:
WILLIAM R. KENNEDY,
F. S. ELMORE.